US012771135B1

(12) United States Patent
Sato et al.

(10) Patent No.: US 12,771,135 B1
(45) Date of Patent: Oct. 20, 2026

(54) POWER FEEDING APPARATUS, POWER FEEDING SYSTEM, AND CONTROL METHOD

(71) Applicants: ALPS ALPINE CO., LTD., Tokyo (JP); HONDA MOTOR CO., LTD., Tokyo (JP)

(72) Inventors: Tetsuo Sato, Fukushima (JP); Yuki Sugiyama, Tokyo (JP)

(73) Assignees: ALPS ALPINE CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/020,103

(22) Filed: Jan. 14, 2025

(30) Foreign Application Priority Data

Jan. 16, 2024 (JP) ................................ 2024-004342

(51) Int. Cl.
*H02J 3/14* (2026.01)

(52) U.S. Cl.
CPC .................................... *H02J 3/14* (2013.01)

(58) Field of Classification Search
None
See application file for complete search history.

(56) References Cited

U.S. PATENT DOCUMENTS 10,014,703 B2 7/2018 Wang et al.
10,673,256 B2 6/2020 Li
11,791,650 B2 10/2023 Perry et al.
2021/0208654 A1* 7/2021 Bhattacharjee ......... H02J 1/109
2022/0060030 A1* 2/2022 Ono ................. G01R 19/16542
2025/0076952 A1* 3/2025 Gurnani .................... G06F 1/28

FOREIGN PATENT DOCUMENTS

JP 2018-206394 12/2018
JP 2019-109898 7/2019

OTHER PUBLICATIONS

Extended European Search Report for 25150927.9 mailed on May 30, 2025.

* cited by examiner

*Primary Examiner* — John W Poos
*Assistant Examiner* — Aqeel H Bukhari
(74) *Attorney, Agent, or Firm* — IPUSA, PLLC

(57) ABSTRACT

A power feeding apparatus includes: a power supplier that supplies power to devices connected to the power supplier, a controller including a memory and a processor coupled to the memory. The processor controls power supplied by the power supplier; communicates with the connected devices; and to supply power to the connected devices, negotiates through a communication with each of the connected devices and determines distribution of power to be supplied to each of the connected devices within a range in which a total of the power to be supplied does not exceed an upper limit value. When a new device is connected while there are one or more devices that have already been connected, the processor lowers a voltage of the power supplied to the already-connected devices, in steps to a first voltage, and negotiates with the new device and the already-connected devices.

7 Claims, 4 Drawing Sheets

POWER FEEDING APPARATUS, POWER FEEDING SYSTEM, AND CONTROL METHOD

CROSS-REFERENCE TO RELATED APPLICATIONS

Priority is claimed to Japanese Patent Application No. 2024-004342, filed Jan. 16, 2024, the entire content of which is incorporated herein by reference.

BACKGROUND

1. Technical Field

The present disclosure relates to a power feeding apparatus, a power feeding system, and a control method, more particularly, to a power feeding apparatus configured to be able to simultaneously supply power to a plurality of devices, a power feeding system including the power feeding apparatus, and a control method by the power feeding apparatus.

2. Description of Related Art

A power feeding apparatus configured to be connectible to a plurality of devices and be able to supply power to each of the plurality of devices is known. In particular, USB PD (power delivery), which is a charging standard of USB Type-C, can supply a large amount of power. By using this feature, a USB PD-compatible power feeding apparatus including a plurality of connectors and configured to be able to supply power to a plurality of devices connected to the plurality of connectors has been widely used.

Japanese Unexamined Patent Publication No. 2018-206394 (hereinafter, "Patent Document 1") discloses a technique relating to such a power feeding apparatus capable of supplying power to each of a plurality of devices. The hub 10 of Patent Document 1 is a power feeding apparatus to which an electronic apparatus 7 (device) and a mobile apparatus 8 (device) are connected, and which supplies power to these apparatuses and charges these apparatuses. The hub 10 is provided with a power supply module 12 for supplying power to these apparatuses and a power distribution control circuit 13 for measuring a power value of the power supplied by the power supply module 12. To supply power to the electronic apparatus 7 and the mobile apparatus 8, the hub 10 adjusts power supplied to the electronic apparatus 7 and power supplied to the mobile apparatus 8, so that a power value measured by a power distribution control circuit 13 does not exceed an upper limit value at which the power can be stably supplied by the power supply module 12.

Further, Japanese Unexamined Patent Publication No. 2019-109898 (hereinafter, "Patent Document 2") discloses the following technique. The master controller 124 on the device side acquires charger capability information regarding the capability of the charger from the USB charger 110 (power feeding apparatus), and sets an optimum power supply level based on the information and its own device charging capability information.

SUMMARY

According to the present disclosure, a power feeding apparatus including: a power supplier configured to supply power to a plurality of devices connected to the power supplier; and a controller including a memory and a processor coupled to the memory. The processor is configured to: control power supplied by the power supplier; communicate with the connected devices; and in order to supply power to the connected devices, negotiate through a communication with each of the connected devices and determine distribution of power to be supplied to each of the connected devices within a range in which a total of the power to be supplied does not exceed an upper limit value. In a case where a new device is connected to the power supplier while there are one or more devices that have already been connected, the processor lowers a voltage of the power supplied to the devices that have already been connected, in steps to a first voltage, and then negotiates with the new device and each of the devices that have already been connected, the new device and the devices that have already been connected being the connected devices.

DETAILED DESCRIPTION

Figure 1:
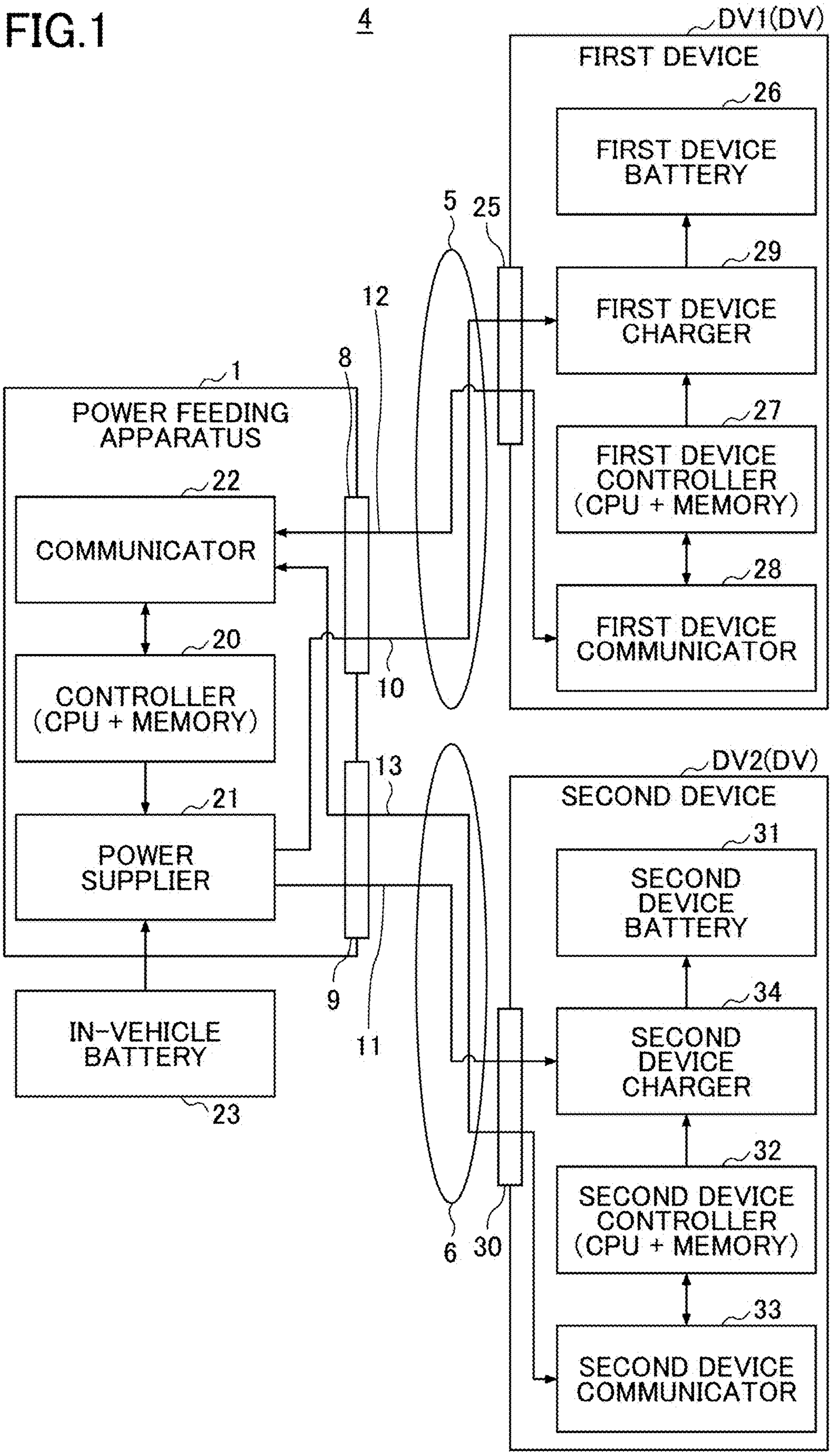
FIG. 1 is a block diagram illustrating an example of a functional configuration of a power feeding apparatus according to an embodiment.

There is a power feeding apparatus capable of supplying power to a plurality of devices connected to the power feeding apparatus that performs the following operation when a new device is connected while there are one or more devices that have already been connected. Hereinafter, a device that is newly connected is referred to as a "new device", and a device(s) that has already been connected when the new device is connected is referred to as an "already-connected device(s)". First, in response to a connection of a new device, the power feeding apparatus sharply lowers the voltage of power supplied to the already-connected device(s) to a certain value. Subsequently, the power feeding apparatus negotiates with each device (the new device and the already-connected device(s)), and determines supply power distribution within a range in which a total of the power to be supplied does not exceed an upper limit value. Then, the power feeding apparatus supplies power to each device in accordance with the determined distribution. The voltage of the power supplied to the already-connected device(s) is lowered to a certain value in order to prevent, even for a moment, a total of the power supplied to the devices from exceeding the upper limit value due to a connection of a new device. A power feeding apparatus that performs the above operation is known. Note that an apparatus compatible with USB PD corresponds to this type of power feeding apparatus.

There are needs for a power feeding apparatus that performs the above operation as described below. There is a need for suppressing an occurrence of a failure as much as possible in a process of starting a supply of power to each device in accordance with power distribution determined as a result of a negotiation performed after a new device is connected. The present disclosure provides a solution, for suppressing an occurrence of a failure, that can lead to reduction of a risk of malfunction and prolongation of the life of the apparatus.

According to the present disclosure, there is provided a power feeding apparatus configured to determine power distribution through a negotiation with each device when a new device is connected while there are one or more devices that have already been connected and to supply power to each device in accordance with the distribution. With this power feeding apparatus, it is possible to suppress an occurrence of a failure in a process of starting a supply of power in accordance with distribution determined after a new device is connected.

In a situation where a device is connected to a power feeding apparatus and power is supplied from the power feeding apparatus to the device, when the voltage of the power supplied to the device is sharply lowered, a failure caused by the voltage drop may occur. As an example, there is a case where some error occurs in the device in response to a rapid voltage drop, or the device performs error processing for preventing an error in response to a rapid voltage drop, and in such a case, a failure may occur due to the error or the error processing. In view of this, according to the present disclosure, when a device is newly connected while there are devices that have already been connected, the voltage of the power supplied to the already-connected devices is not sharply lowered toward a first voltage, but the voltage is lowered in steps to reach the first voltage. Therefore, occurrence of a failure due to a voltage drop of the power supplied to the device can be suppressed.

An embodiment of the present disclosure will be described below with reference to the drawings. FIG. 1 is a diagram illustrating an example of a functional configuration of a power feeding apparatus 1 according to the present embodiment, together with a first device DV1 and a second device DV2 both connected to the power feeding apparatus 1. A power feeding system 4 is made up of the power feeding apparatus 1 and one or more devices connected to the power feeding apparatus 1. The power feeding system 4 is compliant with USB Type-C, and the power feeding apparatus 1 and the first device DV1 are connected to each other via a USB Type-C cable 5 (hereinafter, referred to as a "first cable 5"). The power feeding apparatus 1 and the second device DV2 are connected to each other via a USB Type-C cable 6 (hereinafter, referred to as a "second cable 6").

The power feeding apparatus 1 according to the present embodiment is an apparatus mounted on a vehicle. The power feeding apparatus 1 is mounted on, for example, a car navigation system, a car audio system, or other in-vehicle apparatus. However, the power feeding apparatus 1 may be mounted on an adapter or may be an independent apparatus. The power feeding apparatus 1 is an apparatus compliant with USB PD (Power Delivery), and has a function of supplying power in accordance with USB PD. In particular, the power feeding apparatus 1 includes two (a plurality of) connectors, namely a first source-side connector 8 and a second source-side connector 9, and can supply power simultaneously to two devices DV connected to the first source-side connector 8 and the second source-side connector 9, respectively. A device DV is a device that can be a target of power supply by the power feeding apparatus 1. A power-supplied device DV charges a battery or supplies power to a load. Hereinafter, connecting a device DV to the first source-side connector 8 or the second source-side connector 9 of the power feeding apparatus 1 via a cable may be simply expressed as "device DV is connected to the power feeding apparatus 1".

In the present embodiment, the first source-side connector 8 and the second source-side connector 9 are receptacles compatible to USB Type-C, and are configured to include a VBUS terminal for supplying a bus voltage, a GND terminal for a ground voltage, and a CC (configuration channel) port. Hereinafter, the power supply line corresponding to the first source-side connector 8 (the line used for supplying power to the device DV connected to the first source-side connector 8) is referred to as a "first power supply line 10". The power supply line corresponding to the second source-side connector 9 (the line used for supplying power to the device DV connected to the second source-side connector 9) is referred to as a "second power supply line 11". The CC line corresponding to the first source-side connector 8 (a communication line used for communication with a device connected to the first source-side connector 8) is referred to as a "first CC line 12". The CC line corresponding to the second source-side connector 9 (a communication line used for communication with a device connected to the second source-side connector 9) is referred to as a "second CC line 13".

The first device DV1 and the second device DV2 are electronic devices. The type of the first device DV1 as an electronic device is not limited. The first device DV1 and the second device DV2 are, for example, notebook computers, tablet terminals (including smartphones), portable game machines, or wearable terminals.

As illustrated in FIG. 1, the power feeding apparatus 1 includes a controller 20, a power supplier 21, and a communicator 22.

The controller 20 is a controller compatible with USB PD and USB Type-C, and includes an integrated circuit in which various circuits including a processor are integrated. The controller 20 performs processing in conjunction with hardware and software, for example a processor reading and executing a program stored in a predetermined memory.

The communicator 22 includes transceivers for communication via the first CC line 12 and the second CC line 13, and communicates with the devices DV under the control of the controller 20. Hereinafter, it is assumed that a communication with the device DV by the power feeding apparatus 1 is appropriately performed by the communicator 22, and a detailed description of the communication is omitted. The controller 20 has a function of communicating with each of the devices DV connected to the power feeding apparatus 1 via the communicator 22.

The power supplier 21 includes a power supply circuit including a DC/DC converter, a switch element that opens and closes the first power supply line 10 and the second power supply line 11, and other elements (for example, a necessary switch and a necessary capacitor). The power supplier 21 receives power from an in-vehicle battery 23, which is an external power source. The power supplier 21 converts a voltage of the in-vehicle battery 23, which is an external power source, into an appropriate voltage under the control of the controller 20, and then supplies power to one or more devices DV connected to the power feeding apparatus 1 via the first power supply line 10 and the second power supply line 11. The in-vehicle battery 23 is a battery mounted in the vehicle.

The controller 20 has a function of controlling power supplied by the power supplier 21. The controller 20 can control the power supplier 21 to supply power of a specific voltage value and a specific maximum current value (an upper limit value of current) to each of the devices DV connected to the power feeding apparatus 1. Although the current value of the supply power, in principle, varies depending on circumstances on the device DV side, the current value cannot exceed a maximum current value that is set on the power feeding apparatus 1 side. Hereinafter, a "current" regarding power supplied by the power feeding apparatus 1 means a "current of a value equal to or less than a maximum current value", unless otherwise specified. A "current value" regarding power supplied by the power feeding apparatus 1 means a "maximum current value" (an upper limit value of a current value), unless otherwise specified. In addition, a combination of a voltage value and a current value regarding the power supplied by the power feeding apparatus 1 may be referred to as a "power-related value".

In the power feeding apparatus 1, an upper limit value of electric power that can be simultaneously supplied to all devices DV connected to the power feeding apparatus 1 (hereinafter, referred to as a "supplied power upper limit value") is set in advance. A total value of the power simultaneously supplied to each device DV cannot exceed the supplied power upper limit value. Hereinafter, a total value of the power supplied to all connected devices DV is referred to as a "total supplied power value". The supplied power upper limit value is appropriately set in consideration of the fact that electric power (power source) is supplied from the in-vehicle battery 23. In this example, the supplied power upper limit value is "60 W".

As illustrated in FIG. 1, the first device DV1 includes a first device connector 25 compliant to USB Type-C. The first device connector 25 is configured as a receptacle to which a plug can be connected. The first device connector 25 and the first source-side connector 8 of the power feeding apparatus 1 are connected to each other via the first cable 5. The first device DV1 includes a first device battery 26, which is a secondary battery.

As illustrated in FIG. 1, the first device DV1 includes a first device controller 27, a first device communicator 28, and a first device charger 29, as function blocks.

The first controller 27 is a controller compliant to USB PD and USB Type-C, and includes an integrated circuit in which various circuits including a processor are integrated. The first controller 27 performs processing in conjunction with hardware and software, such as a processor reading and executing a program stored in a predetermined memory.

The first device communicator 28 includes transceivers for communication via the first CC line 12, and realizes communication with the power feeding apparatus 1 under the control of the first device controller 27. Hereinafter, it is assumed that a communication between the power feeding apparatus 1 and the first device DV1 is appropriately performed by the first device communicator 28, and a detailed description of the communication is omitted. The first device controller 27 has a function of communicating with the controller 20 via the first device communicator 28.

The first device charger 29 includes a charging circuit including a DC/DC converter, a switch element that opens and closes the first power supply line 10, and other elements (for example, a necessary switch and a necessary capacitor). The first device charger 29 receives power from the power supplier 21 of the power feeding apparatus 1 via the first power supply line 10. The first device charger 29 charges the first device battery 26 by adjusting a voltage and a current, adjusting power supply timing, and performing necessary processing related to charging, under the control of the first device controller 27.

Although not illustrated in the drawings, the first device DV1 includes a load that receives power from the first device battery 26.

As illustrated in FIG. 1, the second device DV2 includes a second device connector 30 compliant to USB Type-C. The second device connector 30 is configured as a receptacle to which a plug can be connected. The second device connector 30 and the second source-side connector 9 of the power feeding apparatus 1 are connected to each other via the second cable 6. The second device DV2 includes a second device battery 31, which is a secondary battery.

As illustrated in FIG. 1, the second device DV2 includes a second device controller 32, a second device communicator 33, and a second device charger 34, as function blocks.

The second controller 32 is a controller compliant to USB PD and USB Type-C, and includes an integrated circuit in which various circuits including a processor are integrated. The second controller 32 performs processing in conjunction with hardware and software, such as a processor reading and executing a program stored in a predetermined memory.

The second device communicator 33 includes transceivers for communication via the second CC line 13, and realizes communication with the power feeding apparatus 1 under the control of the second device controller 32. Hereinafter, it is assumed that a communication between the power feeding apparatus 1 and the second device DV2 is appropriately performed by the second device communicator 33, and a detailed description of the communication is omitted. The second device controller 32 has a function of communicating with the controller 20 via the second device Communicator 33.

The second device charger 34 includes a charging circuit including a DC/DC converter, a switch element that opens and closes the second power supply line 11, and other elements (for example, a necessary switch and a necessary capacitor). The second device charger 34 receives power from the power supplier 21 of the power feeding apparatus 1 via the second power supply line 11. The second device charger 34 charges the second device battery 31 by adjusting a voltage and a current, adjusting power supply timing, and performing necessary processing related to charging, under the control of the second device controller 32.

Although not illustrated in the drawings, the second device DV2 includes a load that receives power from the second device battery 31.

Next, an operation of the power feeding system 4 when a plurality of devices DV are connected to the power feeding apparatus 1 and power is supplied to the plurality of devices DV by the power feeding apparatus 1 will be described with an example.

Figure 2A:
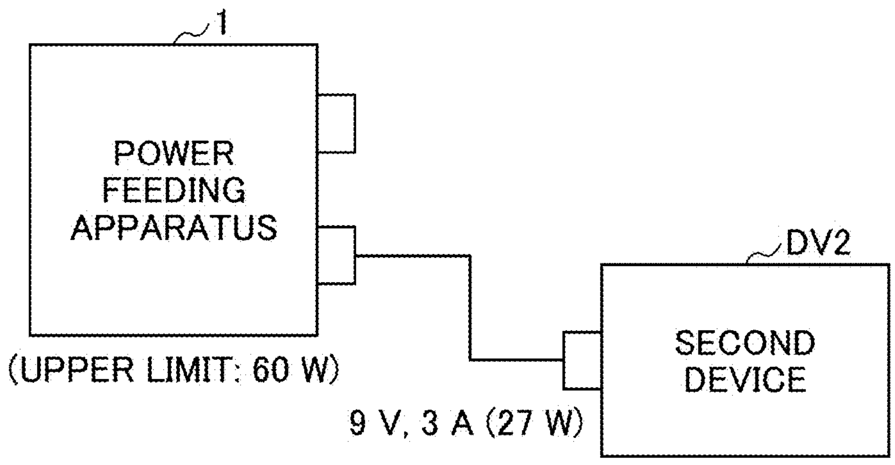
FIG. 2A is a diagram illustrating a state of power supply by the power feeding apparatus of the embodiment.

In the following description, assume that the second device DV2 is first connected to the power feeding apparatus 1. When the second device DV2 is connected to the power feeding apparatus 1, the controller 20 of the power feeding apparatus 1 detects the connection. After detecting the connection, the controller 20 communicates with the second device controller 32 of the second device DV2 and performs negotiation to determine a power-related value of power to be supplied to the second device DV2. In this negotiation, the controller 20 receives a desired power-related value (a voltage value and a current value) from the second device controller 32. Hereinafter, the power-related value desired by a device DV is referred to as a "desired power-related value". In this example, assume that the desired power-related value of the second device DV2 is 27 W where a voltage value is 9 V and a current value is 3 A. In this example, assume that the controller 20 determines 9 V and 3 A (27 W) as the power-related value of power to be supplied to the second device DV2. Hereinafter, the power-related value of the power to be supplied determined for a device DV is referred to as a "determined power-related value". Thereafter, the controller 20 controls the power supplier 21 to supply power to the second device DV2 in accordance with the determined power-related value (in this example, 9 V and 3 A). FIG. 2A illustrates the state at this time.

After the state of FIG. 2A, assume that the first device DV1 is newly connected to the first source-side connector 8. Hereinafter, an operation of the power feeding system 4 when the first device DV1 is newly connected to the first source-side connector 8 will be described.

Figure 3:
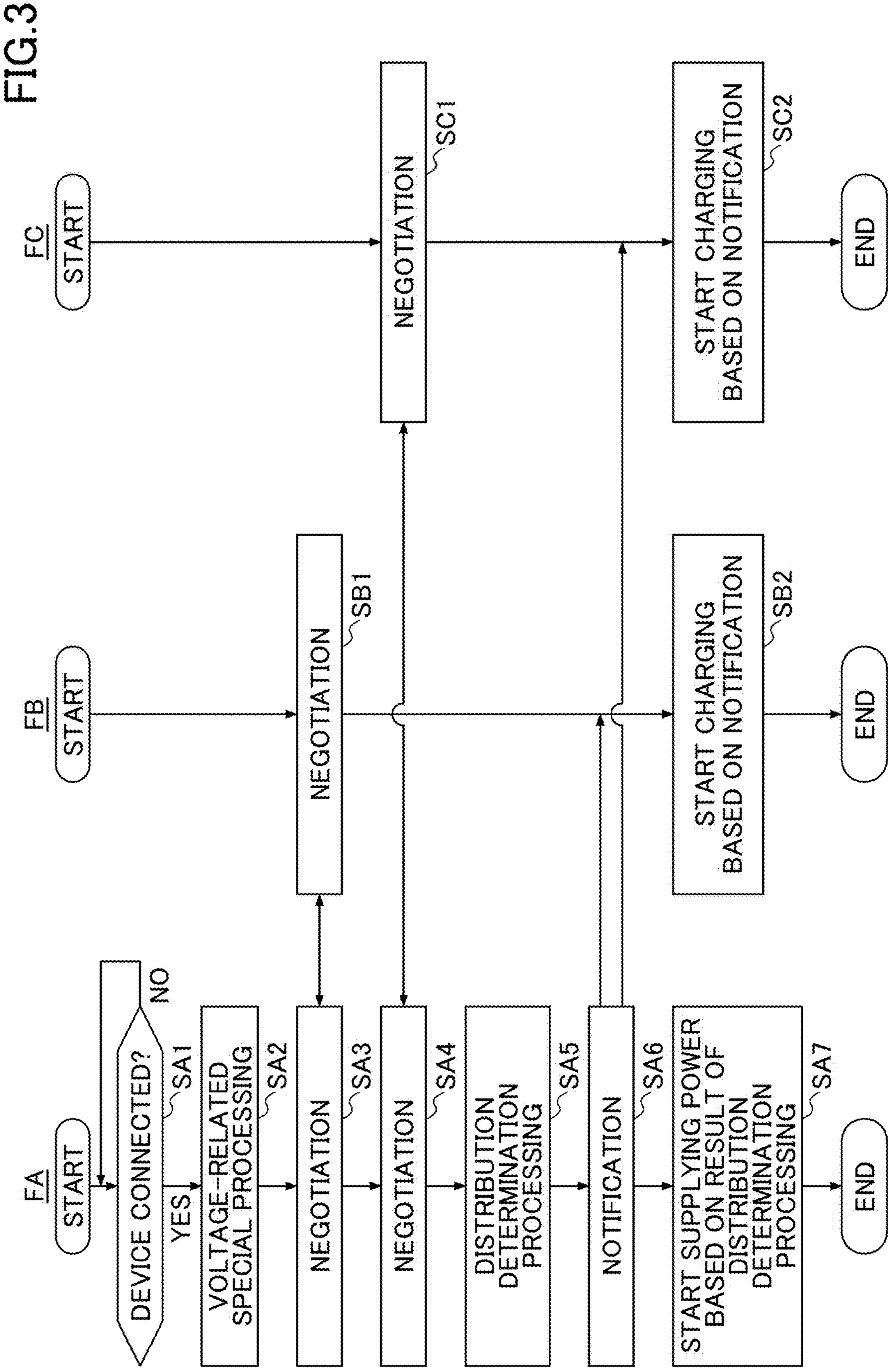
FIG. 3 is a flowchart illustrating an example of an operation of a power feeding system according to the embodiment.

FIG. 3 is flowcharts illustrating the operations of the power feeding apparatus 1, the first device DV1, and the second device DV2. The flowchart FA illustrates a control method by the power feeding apparatus 1, the flowchart FB illustrates a control method by the first device DV1, and the flowchart FC illustrates a control method by the second device DV2. At the start of the flowchart illustrated in FIG. 3, only the second device DV2 is connected to the power feeding apparatus 1 as illustrated in FIG. 2A, and the power feeding apparatus 1 supplies power of 9 V at 3 A (27 W) to the second device DV2.

As illustrated in the flowchart FA, the controller 20 of the power feeding apparatus 1 monitors whether or not any device DV is connected to the first source-side connector 8 (step SAL). In this example, assume that the first device DV1 is connected to the first source-side connector 8 during the monitoring in step SA1. In response to a detection of a connection of the first device DV1 to the first source-side connector 8 (Yes in step SA1), the controller 20 performs voltage-related special processing (step SA2). The voltage-related special processing will be described hereinafter. In the following description, in the case where a device DV is newly connected while a device DV has already been connected to the power feeding apparatus 1, the newly connected device is referred to as a "new device", and the device that has already been connected when the new device is connected is referred to as an "already-connected device (s)"

In the voltage-related special processing, the controller 20 lowers the voltage of the power supplied to the second device DV2 that has already been connected to a corresponding voltage within a period limit. The value of the corresponding voltage is a value to which the voltage value of the already-connected device is to be transitioned when a device DV is newly connected to the power feeding apparatus 1 and before negotiation with each device DV is performed. The voltage of the power supplied to the already-connected device is lowered to a certain value in response to a connection of a new device in order to prevent, even for a moment, a total of the power supplied to each of the devices DV from exceeding the upper limit value due to a connection of a new device DV. A specific value of the corresponding voltage is determined by a corresponding protocol. However, the value of the corresponding voltage may be set independently for the sake of product protection. In the present embodiment, assume that the value of the corresponding voltage is 5 V. The corresponding voltage corresponds to the first voltage. The period limit is an upper limit value of a length of a period required for the voltage to reach the corresponding voltage after a connection of a new device DV is detected. In other words, the controller 20 causes the voltage of the power supplied to the already-connected device to reach the corresponding voltage before the period limit elapses after a connection of a new device is detected. The period limit is determined by the corresponding protocol or is set independently.

The controller 20 according to the present embodiment performs the following special processing when lowering the voltage value of the power supplied to the already-connected device to the corresponding voltage. The controller 20 lowers in steps the voltage of the power supplied to the already-connected device to the corresponding voltage (first voltage). More specifically, the controller 20 lowers the voltage of the power supplied to the already-connected device to a "relay voltage", which is higher than the corresponding voltage, maintains the state where the voltage is at the relay voltage for a predetermined period, and thereafter lowers the voltage to the corresponding voltage. The relay voltage corresponds to a "second voltage".

Figure 4:
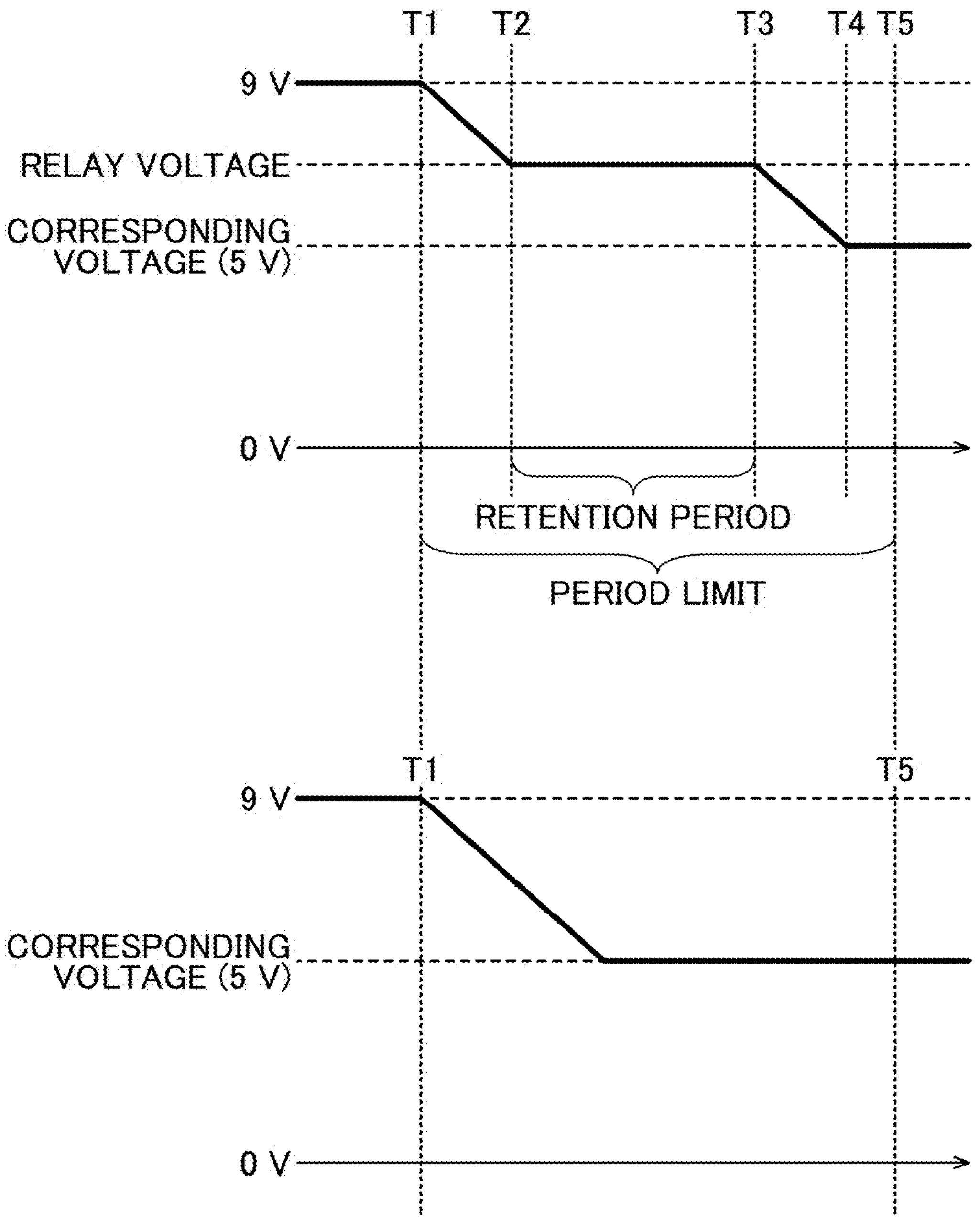
FIG. 4 is a graph illustrating a voltage transition according to the embodiment.

FIG. 4 is a graph illustrating a transition of the voltage value of the power supplied to the second device DV2 when the controller 20 performs the voltage-related special processing for the second device DV2 in the present embodiment. In FIG. 4, the horizontal axis indicates the elapse of time, from left to right. The voltage-related special processing performed by the controller 20 for the second device DV2 will be described hereinafter, with reference to FIG. 4. Assume that the controller 20 detects a connection of the first device DV1 at timing T1 as illustrated in FIG. 4. Then, the controller 20 starts to lower the voltage of the power supplied to the second device DV2. Next, the controller 20 stops lowering the voltage when the voltage of the power supplied to the second device DV2 reaches the relay voltage at timing T2. Next, the controller 20 maintains the state in which the voltage of the supplied power is the relay voltage during the retention period. The retention period is a period predetermined as a period during which the state in which the voltage value is the relay voltage is maintained. The length of the retention period is set in advance in consideration of the length of the period limit.

The controller 20 starts to lower the voltage of the power supplied to the second device DV2 at timing T3 at which the elapsed time from timing 12 reaches the retention period. Next, the controller 20 stops lowering the voltage when the voltage of the power supplied to the second device DV2 reaches the corresponding voltage at timing T4. The retention period is determined and processing related to the voltage drop is performed by the controller 20 in such a manner that timing T4 arrives before the period limit starting from timing T1 elapses (before timing T5 arrives in the top graph of FIG. 4). The above is the voltage-related special processing performed by the controller 20 for the second device DV2.

As described above, in the present embodiment, when a new device DV is connected, the controller 20 lowers in steps the voltage of the power supplied to the already-connected device DV to the corresponding voltage (first voltage). More specifically, the controller 20 lowers the voltage of the power supplied to the already-connected device DV to a "relay voltage", which is higher than the corresponding voltage, maintains the state where the voltage is at the relay voltage for a predetermined period, and then lowers the voltage to the corresponding voltage. The present embodiment therefore achieves the following effects.

The bottom graph of FIG. 4 illustrates a state in which the voltage of a connected device is lowered when a new device is connected in a conventional power feeding apparatus to which the technology according to the present embodiment is not applied. As illustrated in the bottom graph of FIG. 4, the controller of a conventional power feeding apparatus lowers the voltage of power supplied to connected devices toward a corresponding voltage after a connection detection timing (timing T1), and stops lowering the voltage when the voltage reaches the corresponding voltage. In this configuration, the voltage of the power supplied to the connected device is sharply lowered, and there is a possibility that a failure occurs due to the voltage drop. As an example, there is a case where some error occurs in the connected device in response to a rapid voltage drop, or the device performs error processing for preventing an error in response to a rapid voltage drop, and in such a case, a failure may occur due to the error or the error processing. In view of this, according to the configuration of the present embodiment, when a new device is connected while there are devices that have already been connected, the voltage of the power supplied to the already-connected devices is not sharply lowered toward the corresponding voltage, but the voltage is lowered in steps to reach the corresponding voltage. Therefore, it is possible to suppress an occurrence of a failure due to a voltage drop of the power supplied to the already-connected devices.

In the present embodiment, in the voltage-related special processing, instead of a gentle voltage drop amount per unit time, a retention period in which the voltage is not lowered is provided, so that the voltage value is lowered in steps. Thus, the voltage can be lowered to the corresponding voltage while preventing a period in which the voltage is continuously lowered, that is, a period in which the voltage continuously changes, from being prolonged. This can suppress a failure that may occur with an increase in a period in which the voltage continuously changes.

The value of the relay voltage is determined in advance from the viewpoint of suppressing an occurrence of a failure as much as possible. As an example, the value of the relay voltage is set to a value between 6.8 V and 8 V. When a new device is connected, if the voltage of the power supplied to the connected device is equal to or lower than the relay voltage, the controller 20 does not perform the voltage-related special processing and lowers the voltage of the power supplied to the existing device toward the corresponding voltage. The controller 20 sets the voltage of the power supplied to the new device immediately after the new device is connected to the corresponding voltage.

After the voltage-related special processing is performed as illustrated in FIG. 3 and the voltage value of the power supplied to the second device DV2 is set to the corresponding voltage (5 V in the present embodiment), the controller 20 negotiates with the first device controller 27 of the first device DV1 in accordance with a protocol (step SA3 and step SB1). In this negotiation, the controller 20 receives a desired power-related value from the first device controller 27. In this example, assume that the desired power-related value of the first device DV1 is 45 W where a voltage value is 15 V and a current value is 3 A. At the same time, the controller 20 negotiates with the second device controller 32 of the second device DV2 according to the protocol (step SA4 and step SC1). In this negotiation, the controller 20 receives a desired power-related value from the second device controller 32. In this example, assume that the desired power-related value of the second device DV2 is 27 W where a voltage value is 9 V and a current value is 3 A.

Subsequently, the controller 20 performs the distribution determination processing based on the desired power-related values of the first device DV1 and the second device DV2 (step SA5). The distribution determination processing is processing of determining distribution of power to be supplied to a plurality of connected devices DV (the first device DV1 and the second device DV2 in the present example). The distribution determination processing in step SA5 will be described in detail below. As described above, the upper limit value for supplied power is set to 60 W in the power feeding apparatus 1. In such a case where the supplied power upper limit value is 60 W, the power feeding apparatus 1 cannot supply power of 45 W to the first device DV1 and power of 27 W to the second device DV2. This is because a total value of the supplied power (45 W+27 W=72 W) exceeds the upper limit value for the supplied power (60 W).

In the distribution determination processing in step SA3, the controller 20 determines the distribution of power to be supplied to each of the first device DV1 and the second device DV2 in accordance with the following conditions:

<Condition R1> A total value of the supplied power is set to be equal to or less than the upper limit value of supplied power and as close as possible to the upper limit value of supplied power.

<Condition R2> The distribution to each of the first and second devices DV1 and DV2 is made to be as close as possible to the desired power-related value of each of these devices DV.

However, the voltage value of the supplied power is set so as not to exceed the voltage value of the desired power-related value.

In this example, the desired power-related value of the first device DV1 is 45 W where a voltage value is 15 V and a current value is 3 A, and the desired power-related value of the second device DV2 is 27 W where a voltage value is 9 V and a current value is 3 A. In this case, on the assumption that the power-related value of the power supplied to the first device DV1 is the product of 15 V and 3 A, and the power-related value of the power supplied to the second device DV2 is the product of 9 V and 3 A, the total value of the supplied power (27 W+45 W=72 W) exceeds the supplied power upper limit value (60 W). Therefore, the controller 20 does not perform such distribution, but performs the following distribution for example.

The controller 20 determines the power-related value of the power supplied to the first device DV1 as 33 W where a voltage value is 15 V and a current value is 2.2 A, and determines the power-related value of the power supplied to the second device DV2 as 27 W where a voltage value is 9 V and a current value is 3 A. By determining in this way, conditions R1 and R2 are satisfied. Regarding condition R1, the supplied power total value (33 W+27 W) is equal to or less than the supplied power upper limit value (60 W) and is as close as possible to the supplied power upper limit value (60 W). Regarding condition R2, the distribution (15 V, 2.2 A) of the first device DV1 and the distribution (9 V, 3 A) of the second device DV2 are as close as possible to the desired power-related values (15 V, 3 A) of the first device DV1 and the desired power-related values (9 V, 3 A) of the second device DV2, respectively.

Figure 2B:
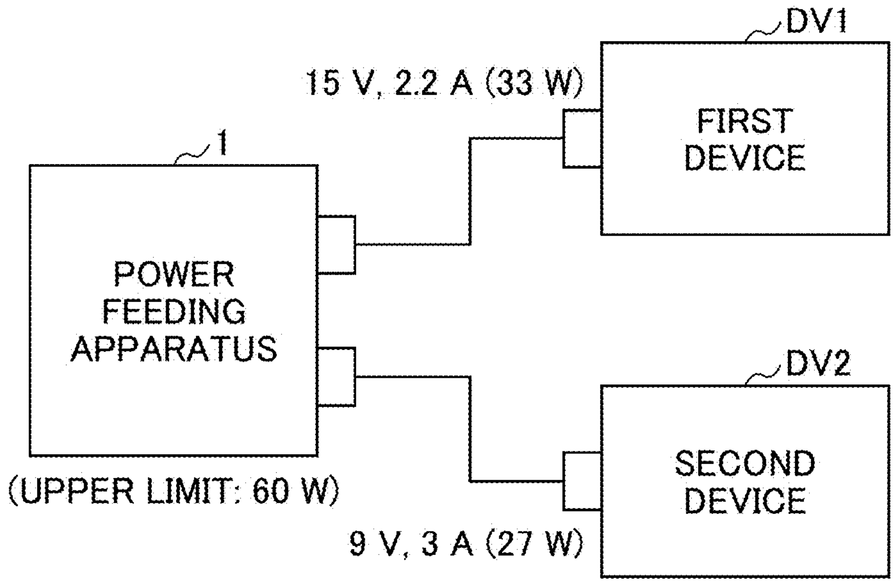
FIG. 2B is a diagram illustrating a state of power supply by the power feeding apparatus according to the embodiment.

Although conditions R1 and R2 are given as the conditions to be followed by the controller 20 to determine distribution of the feed power, the conditions are not limited to these conditions. In particular, when there is a condition defined by the protocol, the controller 20 naturally determines distribution in accordance with the condition. In the distribution determination processing, the controller 20 may communicate with the first device controller 27 and the second device controller 32 to exchange various types of information. In this example, in the distribution determination processing, the controller 20 determines the power-related value of the power supplied to the first device DV1 (i.e., the determined power-related value for the first device DV1) to be 33 W where a voltage value is 15 V and a current value is 2.2 A, and further determines the power-related value of the power supplied to the second device DV2 (i.e., the determined power-related value for the second device DV2) to be 27 W where a voltage value is 9 V and a current value is 3 A, as illustrated in FIG. 2B.

As illustrated in the flowchart FA, after the distribution determination processing in step SA5, the controller 20 notifies the first device controller 27 of the determined power-related value (15 V, 2.2 A) determined for the first device DV1, and notifies the second device controller 32 of the determined power-related value (9 V, 3 A) determined for the second device DV2 (step SA6), Next, the controller 20 starts supplying power to the first device DV1 and the second device DV2 in accordance with the distribution determined in the distribution determination processing (step SA7). Specifically, the controller 20 controls the power supplier 21 to supply power corresponding to the determined power-related value of the first device DV1 to the first device DV1, and to supply power corresponding to the determined power-related value of the second device DV2 to the second device DV2.

As illustrated in the flowchart FB, in response to the notification in step SA6, the first device controller 27 controls the first device charger 29 to start charging the first device battery 26 based on the electric power supplied from the power feeding apparatus 1 (step SB2). As illustrated in the flowchart FC, in response to the notification in step SA6, the second device controller 32 controls the second device charger 34 to start charging the second device battery 31 based on the power supplied from the power feeding apparatus 1 (step SC2).

As described above, the controller 20 according to the present embodiment has a function of negotiating through communication with the devices DV before starting the supply of power to the devices DV, and determining the distribution of power to be supplied to the devices DV within a range in which a total of power to be supplied does not exceed the upper limit value when power is supplied to the plurality of devices DV.

As described above, the power feeding apparatus 1 according to the present embodiment includes the power supplier 21 capable of supplying power to a plurality of connected devices DV, and the controller 20 having a function of controlling power supplied by the power supplier 21, a function of communicating with the connected devices DV, and a function of negotiating through a communication with each of the devices DV and determining distribution of power to be supplied to each of the devices DV within a range in which the total of power to be supplied does not exceed the upper limit value. In the case where a new device DV is connected while one or more devices DV are connected, the controller 20 is configured to lower in steps the voltage of the power supplied to the devices DV that have already been connected, to the corresponding voltage, and negotiate thereafter with each of the devices DV.

According to this configuration, when a device is newly connected while there are devices that have already been connected, the voltage of the power supplied to the already-connected devices is not sharply lowered toward a first voltage but is lowered in steps to reach the first voltage. Therefore, it is possible to suppress an occurrence of a failure due to a voltage drop of the power supplied to the already-connected devices.

The embodiment of the present disclosure that has been described above is merely an example of the embodiment for carrying out the present disclosure, and the technical scope of the present disclosure should not be interpreted in a limited manner by the embodiment. That is, the present disclosure can be implemented in various forms without departing from the gist or main features of the present disclosure.

For example, in the foregoing embodiment, in the voltage-related special processing, the controller 20 lowers the voltage of the power supplied to the connected device to the relay voltage and then further lowers the relay voltage to the corresponding voltage. In other words, in the foregoing embodiment, the controller 20 lowers the voltage of the power supplied to the connected device by one step, maintains the state for a certain period, and then lowers the voltage to the corresponding voltage. In this regard, the controller 20 may be configured to lower the voltage of the power supplied to the connected device to the corresponding voltage in two or more steps.

For example, in the foregoing embodiment, the power feeding apparatus 1 is mounted on the vehicle. However, the power feeding apparatus 1 does not need to be mounted on the vehicle. In the case where power supplied from an AC power source, such as a commercial power source, is supplied to the power feeding apparatus 1, the power supplier 21 is configured to include an AC/DC converter and performs AC/DC conversion appropriately.

The function blocks described in the foregoing embodiment can be implemented by discretionarily selected hardware or through a conjunction between discretionarily selected hardware and discretionarily selected software. In other words, these function blocks are not limited to specific hardware.

The power feeding apparatus 1 described above includes the connectors (the first source-side connector 8 and the second source-side connector 9). However, the power feeding apparatus 1 may be an apparatus of a type in which a connector is not provided and a cable compliant to a standard is integrated.

In the foregoing embodiment, the number of devices DV that can be charged at once by the power feeding apparatus 1 is two, but the number may be three or more.

For example, the controller 20 may be configured to perform various types of processing in conjunction with an external apparatus, for the processing described as being performed by the controller 20 alone. As an example, the controller 20 may perform the processing in conjunction with a processor of an apparatus in which the power feeding apparatus 1 is mounted, or may perform the processing in conjunction with an external apparatus capable of communicating via a network.

For the processing illustrated in the flowcharts, the order of the steps may be changed, the steps may be divided into smaller steps, steps may be added, or the steps may be eliminated, as long as the advantageous effects of the present disclosure can be achieved.

In the foregoing embodiment, the power feeding apparatus 1 is an apparatus that performs power supply in conformity with USB PD. However, the standard with which the power feeding apparatus 1 conforms is not limited to USB PD.

Further, for example, a provision of a program executed by the computer of the power feeding apparatus 1 can be included in the embodiment. Further, the embodiment may include a provision of a recording medium in which the program is recorded in a computer-readable manner. As the recording medium, a magnetic or optical recording medium or a semiconductor memory device can be used. Specific examples of the recording medium include portable or fixed recording media, such as a flexible disc, a hard disk drive (HDD), a compact disc read only memory (CD-ROM), a digital versatile disc (DVD), a Blu-ray (registered trademark) disc, a magneto-optical disc, a flash memory, and a card-type recording medium.

What is claimed is:

1. A power feeding apparatus, comprising:
- a power supplier configured to supply power to a plurality of devices connected to the power supplier; and
- a controller including a memory and a processor coupled to the memory, the processor being configured to:
  - control power supplied by the power supplier;
  - communicate with the connected devices; and
  - in order to supply power to the connected devices, negotiate through a communication with each of the connected devices and determine distribution of power to be supplied to each of the connected devices within a range in which a total of the power to be supplied does not exceed an upper limit value, wherein
- in a case where a new device is connected to the power supplier while there are one or more devices that have already been connected, the processor lowers a voltage of the power supplied to the devices that have already been connected, in steps to a first voltage, and, after lowering of the voltage to the first voltage is completed, negotiates with the new device and each of the devices that have already been connected, the new device and the devices that have already been connected being the connected devices.

2. The power feeding apparatus according to claim 1, wherein
- in a case where the new device is connected while there are one or more devices that have already been connected, the controller
  - lowers a voltage of the power supplied to the devices that have already been connected to a second voltage higher than the first voltage,
  - maintains the second voltage for a predetermined period, and lowers the second voltage to the first voltage, and
  - then negotiates with the new device and each of the devices that have already been connected.

3. The power feeding apparatus according to claim 1, wherein
- the power feeding apparatus is mounted on a vehicle.

4. A power feeding system comprising a power feeding apparatus and a device, the power feeding apparatus including:
- a power supplier configured to supply power to a plurality of devices connected to the power supplier; and
- a controller including a memory and a processor coupled to the memory, the processor being configured to:
  - control power supplied by the power supplier;
  - communicate with the connected devices; and
  - in order to supply power to the connected devices, negotiate through a communication with each of the connected devices and determine distribution of power to be supplied to each of the connected devices within a range in which a total of the power to be supplied does not exceed an upper limit value, wherein
- in a case where a new device is connected while there are one or more devices that have already been connected, the processor lowers a voltage of the power supplied to the devices that have already been connected, in steps to a first voltage, and, after lowering of the voltage to the first voltage is completed, negotiates with the new device and each of the devices that have already been connected, the new device and the devices that have already been connected being the connected devices.

5. A control method for a power feeding apparatus comprising a power supplier configured to supply power to a plurality of devices connected to the power feeding apparatus, and a controller, the controller including a memory and a processor coupled to the memory, the method comprising:
- in a case where a new device is connected while there are one or more devices that have already been connected, controlling, by the processor, the power supplier to lower a voltage of the power supplied to the connected devices that have already been connected, in steps to a first voltage; and
- negotiating, after lowering of the voltage to the first voltage is completed, by the processor, through a communication with each of the connected devices, and determining, by the processor, distribution of power to be supplied to each of the connected devices within a range in which a total of power to be supplied does not exceed an upper limit value.

6. The power feeding apparatus according to claim 1, wherein the processor lowers the voltage of the power supplied to the devices that have already been connected, in steps to the first voltage by maintaining a second voltage higher than the first voltage for a retention period, within a period limit, the period limit being an upper limit value of a length of a period required for the voltage to reach the first voltage after the connection of the new device is detected.

7. The power feeding apparatus according to claim 2, wherein, in a case where the voltage of the power supplied to the devices that have already been connected is equal to or lower than the second voltage when the new device is connected, the processor lowers the voltage of the power supplied to the devices that have already been connected toward the first voltage without maintaining the second voltage for the predetermined period.

* * * * *